Feb. 12, 1952 V. R. BRIGGS 2,585,532

FREQUENCY DISCRIMINATING CIRCUIT

Filed Jan. 26, 1948

INVENTOR

VERNON R. BRIGGS

BY [signature]

ATTORNEY

Patented Feb. 12, 1952 2,585,532

UNITED STATES PATENT OFFICE 2,585,532

FREQUENCY DISCRIMINATING CIRCUIT

Vernon R. Briggs, Pasadena, Calif., assignor to Bendix Aviation Corporation, South Bend, Ind., a corporation of Delaware Application January 26, 1948, Serial No. 4,425

5 Claims. (Cl. 250—27)

Figure 1:
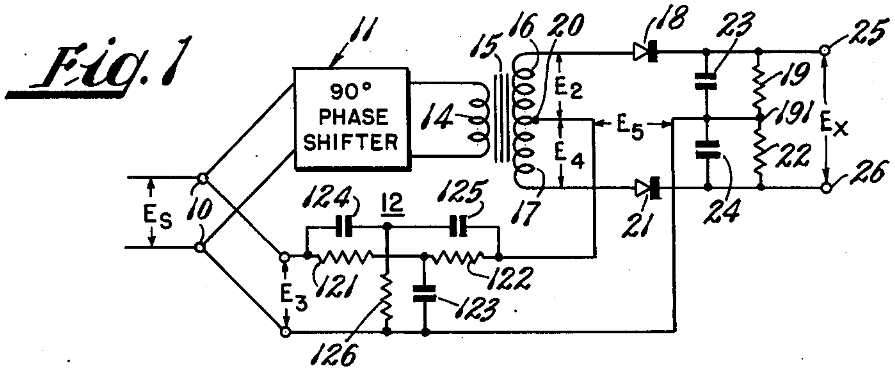

This invention relates to frequency modulation systems, and more particularly to frequency-responsive circuits, or frequency discriminators as they are more commonly referred to, for producing a direct current varying in amplitude in accordance with frequency variations of an A. C. signal wave.

An object of the invention is to provide a stable frequency discriminator.

Another object is to provide a particularly simple and stable frequency discriminating circuit for waves of relatively low frequency.

Another object is to provide a frequency discriminator circuit that has a predictable frequency range and requires few adjustments either at the factory or in the field.

Another object is to provide a frequency discriminator that can be fabricated from standard parts.

Other more specific objects and features of the invention will become apparent from the description to follow of certain embodiments thereof.

The present frequency discriminator differs essentially from other frequency discriminators known to me in that in place of the usual resonant circuits, it employs what is known as a twin T network consisting solely of resistors and capacitors, one T of the network comprising two resistors in series with a shunt capacitor between them, and the other T comprising two capacitors in series with each other and in parallel with the two first mentioned resistors, the shunt element of the other T consisting of a resistor. The values of the capacitors and resistors are prescribed only to the extent that the shunt capacitor must have twice the value of each of the series capacitors, and the shunt resistor must have half the resistance of each of the series resistors. Such a network has zero output at a critical frequency $f_0$, which frequency is equal to $$\frac{1}{2\pi RC}$$

where R represents the value of each series resistor and C represents the value of each series capacitor. The twin T network has the further useful characteristic that when the frequency rises above the critical frequency, the output increases substantially linearly and the phase of the output wave is advanced nearly 90° relative to the input wave, whereas when the frequency is reduced below the critical frequency, the amplitude of the output also increases linearly with the departure in the frequency, but the phase of the output wave lags the input wave by nearly 90°.

In accordance with the present invention the input of a twin T network as described has applied thereto the frequency modulated signal wave that is to be detected, and its output is combined with other potentials derived from the signal voltage, and the resultant rectified, the arrangement being such that the rectified output current has zero value when the frequency of the signal wave is equal to the critical frequency of the twin T network, but the rectified current increases in amplitude with any departure from the critical frequency in either direction, being of one polarity when the frequency departure is in one direction, and of the opposite polarity when the frequency departure is in the opposite direction.

The new circuit has substantial advantages over conventional frequency discriminating circuits, because the heart of the system is the twin T network consisting only of resistors and capacitors which are readily obtainable in accurately gauged sizes such that they can be computed in advance to give a known performance with no adjustment necessary after assembly. The system is particularly useful for detecting frequency modulated waves of relatively low frequency, because the resistor and capacitor values are within readily obtainable ranges.

Another advantageous feature of my circuit is that it is possible to compensate for the losses of the twin T network by means of a simple conventional A. C. amplifier, and thereby eliminate the necessity for employing a D. C. amplifier. This is desirable because of the relative instability of D. C. amplifiers. Another factor contributing to the stability of the discriminator is the fact that no coupled resonant circuits are employed. It is recognized that the adjustment of coupled circuits is often very critical.

The present invention is useful in a variety of systems where frequency variations of an alternating current are to be detected.

Figure 2:
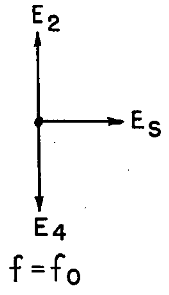
Figure 3:
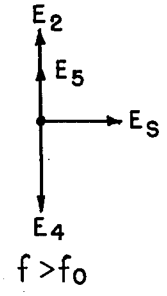
Figure 4:
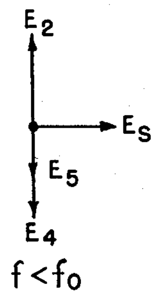
Figure 5:
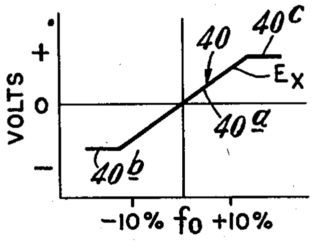
Figure 6:
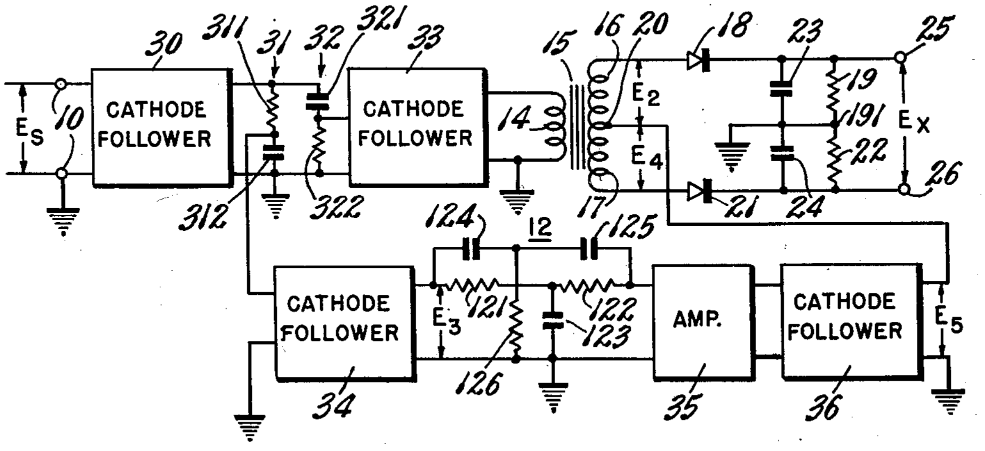

In the drawing:

Fig. 1 is a highly schematic circuit showing a simple form of the invention;

Figs. 2, 3, and 4 are vector diagrams illustrating the operation of the circuit of Fig 1;

Fig. 5 is a graph illustrating the electrical characteristics of a twin T network; and Fig. 6 is a schematic circuit showing an actual circuit incorporating the invention that may be employed.

Referring first to Fig. 1, a frequency-modulated A. C. wave of potential $E_s$ is applied to a pair of input terminals 10 which are connected in parallel to the input of a phase shifter 11 and a twin T network 12. The output of the phase shifter 11 is shifted 90° with respect to the input and is connected to the primary winding 14 of a transformer 15 having a mid-tapped secondary winding consisting of two sections 16 and 17 respectively, connected in series. The outer ends of the secondary windings 16 and 17 are interconnected through a rectifier 18, load resistors 19 and 22, and a rectifier 21. The load resistors 19 and 22 are shunted by filtering condensers 23 and 24 respectively.

The output of the twin T network 12 is connected in series in the common return path from the junction 191 of the load resistors 19 and 22 back to the mid-tap 20 of the secondary windings 16 and 17. This twin T network 12 consists of a pair of series resistors 121 and 122 and a shunt capacitor 123 constituting one T network, and a pair of series capacitors 124 and 125 and a shunt resistor 126 constituting the other T network.

As has been previously indicated, at a critical or null frequency, the output of a twin T network is zero and the value of the null frequency $f_0$ may be determined from the formula:

$$f_0=\frac{1}{2\pi RC}$$

In practice $f_0$ is chosen as the center frequency of the variable frequency signal wave $E_s$ to be detected. When the signal wave is at the null frequency $f_0$, the potentials present at various points in the circuit of Fig. 1 are as shown in the vector diagram of Fig. 2. In this diagram, the phase of the signal voltage $E_s$ is chosen as the reference value in zero position. The potential in the output circuit of the phase shifter 11 is shifted 90°, so that the potential $E_2$ across the transformer winding 16 is shown in Fig. 2 displaced in 90° leading relation with respect to $E_s$. The potential $E_4$ developed in the secondary section 17 is displaced 180° from the potential $E_2$ as indicated in Fig. 2. Under the conditions described, the output of the twin T network 12 is zero. Therefore $E_5$ is zero and the potentials developed across the two load resistors 19 and 22 are equal, and the potential $E_x$ between the output terminals 25 and 26 is zero.

The vector diagram of Fig. 3 represents the condition when the frequency of the signal wave is greater than $f_0$. Under this condition, the potentials $E_2$ and $E_4$ are the same as before, but the twin T network 12 now develops an output wave $E_5$ and this wave is advanced in phase substantially 90° with respect to the input wave $E_s$ and is therefore substantially in phase with the potential $E_2$. This potential $E_5$ is therefore added to $E_2$ and subtracted from $E_4$, producing a higher potential at terminal 25 than at terminal 26, the potential difference being a measure of the departure of the frequency of the signal wave from a null value in one direction.

Fig. 4 represents the potentials in the circuit when the frequency of the signal wave is less than the null frequency $f_0$. Under these conditions, the twin T network 12 develops an output potential $E_5$ that lags the input or signal potential $E_s$. This potential $E_5$ therefore is in aiding relation with $E_4$ and opposing relation with $E_2$, producing a potential difference between the terminals 25 and 26 that is again proportional to the departure of the frequency of the signal wave from the null frequency $f_0$, but is of opposite polarity to that resulting from the conditions of Fig. 3.

In actual practice, the basic circuit of Fig. 1 may be modified as shown in Fig. 6, which differs essentially from the circuit of Fig. 1 in the use of: (1) cathode followers introduced at various points in the circuit for the purpose of matching impedances and improving stability; (2) the use of two 45° phase shifters in the two branches of the circuit instead of a single 90° phase shifter in only one branch; and (3) the use of an A. C. amplifier in the circuit branch containing the twin T network to compensate for the losses inherent in the network.

Thus it will be observed that in Fig. 6 the input terminals 10 are connected directly to the input circuit of a cathode follower 30, the output circuit of which contains two R. C. circuits 31 and 32 connected in parallel. The circuit 31 contains a resistor 311 and a capacitor 312 with the capacitor connected to the grounded side of the output of the cathode follower 30. The other R. C. circuit 32 comprises a capacitor 321 and a resistor 322 with the latter connected to the grounded side of cathode follower 30. A second cathode follower 33 has its input circuit connected across the resistor 322 and its output circuit connected to the primary winding 14 of the transformer 15. A third cathode follower 34 has its input circuit connected across the capacitor 312 and its output circuit connected to the input circuit of the twin T network 12. The output circuit of the twin T network 12 is connected through an amplifier 35 and a fourth cathode follower 36 to the mid-tap of the secondary winding of the transformer 15.

The potential across the capacitor 312 lags the output potential of the cathode follower 30 by approximately 45°, whereas the potential across the resistor 322 leads the output potential by about 45°, thereby effecting a total phase shift of approximately 90° between the potential waves delivered to the cathode followers 33 and 34 respectively.

The amplifier 35 is designed to compensate for the losses introduced by the twin T network 12 and to deliver a potential through the cathode follower 36 to the mid-tap 20 that is substantially equal to the voltage $E_2$ or $E_4$ under conditions of maximum departure of the frequency of the signal current from the null frequency.

To overall characteristics of the circuit shown in Fig. 6 are approximately as illustrated in Fig. 5, in which the curve 40 represents the magnitude and polarity of the D. C. potential $E_x$ between the output terminals 25 and 26 with variations of the signal frequency below and above the null frequency $f_0$. It will be observed that over a frequency range of approximately 10% below and above the null frequency, the output voltage $E_x$ varies substantially linearly, as shown by the straight, sloping portion 40a of the curve 40. The frequency range over which the response is linear can be varied by varying the gain of the amplifier 35. Thus, the curve becomes flat, as indicated at 40b and 40c when the magnitude of the potential $E_5$ equals that of $E_2$ and $E_4$, and the magnitude of the frequency departure required to make $E_5$ equal $E_2$ and $E_4$ depends upon the amplification introduced by the amplifier 35.

Although for the purpose of explaining the invention, a particular embodiment thereof has been shown and described, obvious modifications will occur to a person skilled in the art, and I do not desire to be limited to the exact details shown and described.

I claim:

1. The method of detecting frequency variations in a variable frequency A. C. signal wave which comprises: deriving from said signal wave second and third A. C. waves of the same frequency but differing from each other in phase substantially 90° throughout the operating frequency range; deriving from said signal wave a fourth A. C. wave 180° out of phase with said second wave; deriving from said third wave a fifth A. C. wave of the same frequency that has zero amplitude at a null frequency and that increases in amplitude with departures of frequency in either direction from said null value, and the phase of which with respect to the third wave leads substantially 90° for all amplitudes when the frequency exceeds said null value and lags substantially 90° for all amplitudes when the frequency drops below said null value; combining said second and fifth waves and rectifying them to produce a first direct current; combining said fourth and fifth waves to produce a second direct current; and combining said first and second direct currents in polar opposition to produce a direct current the amplitude of which varies with the frequency of said signal wave.

2. Frequency discriminating apparatus comprising: means for deriving from an A. C. signal wave second and third A. C. waves of the same frequency but differing from each other in phase by substantially 90° throughout the operating frequency range; means for deriving from said signal wave a fourth A. C. wave 180° out of phase with said second wave; means for deriving from said third wave a fifth A. C. wave of the same frequency that has zero amplitude at a null frequency and that increases in amplitude with departure of frequency in either direction from said null value and the phase of which leads that of the third wave substantially 90° when the frequency exceeds said null value and lags that of the third wave substantially 90° when the frequency drops below said null value; means for combining said second and fifth waves and rectifying them to produce a first direct current; means for combining said fourth and fifth waves and rectifying them to produce a second direct current; and means for combining said first and second direct currents in polarity opposition to produce a direct current the amplitude of which varies with the frequency of said signal wave.

3. Apparatus according to claim 2 in which said means for deriving said fifth wave comprises a twin T network having zero output at said null frequency, said twin T network having separate input and output terminals, said third wave being applied to said input terminals, and said second and fourth waves being applied through said output terminals to said rectifying means.

4. Apparatus according to claim 2 in which said means for deriving said fifth wave has an output impedance that is substantially without reactance over the operating frequency range whereby said fifth wave is combined with said second and fourth waves without altering the phase of the latter.

5. Apparatus according to claim 2 in which said means for deriving said third and fourth waves comprises a non-resonant impedance network and an untuned transformer, and said means for deriving said fifth wave has an output impedance that is substantially without reactance over the operating frequency range whereby said fifth wave is combined with said second and fourth waves in phase with one or the other of the latter throughout the operating frequency range.

VERNON R. BRIGGS.

REFERENCES CITED

The following references are of record in the file of this patent:

UNITED STATES PATENTS

| Number | Name | Date |
|---|---|---|
| 2,323,609 | Kihn | July 6, 1943 |
| 2,415,468 | Webb | Feb. 11, 1947 |
| 2,495,023 | Sebring et al. | Jan. 17, 1950 |